(12) United States Patent
Goyal et al.

(10) Patent No.: US 11,647,055 B2
(45) Date of Patent: *May 9, 2023

(54) CLOUD APPLICATION DESIGN FOR EFFICIENT TROUBLESHOOTING

(71) Applicant: Zscaler, Inc., San Jose, CA (US)

(72) Inventors: Rohit Goyal, Chandigarh (IN); Rishabh Gupta, Chandigarh (IN)

(73) Assignee: Zscaler, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/728,254

(22) Filed: Apr. 25, 2022

(65) Prior Publication Data

US 2022/0255967 A1 Aug. 11, 2022

Related U.S. Application Data

(63) Continuation of application No. 17/375,338, filed on Jul. 14, 2021, now Pat. No. 11,349,880, which is a continuation-in-part of application No. 16/992,281, filed on Aug. 13, 2020, now Pat. No. 11,070,578, which is a continuation-in-part of application No. 16/658,264, filed on Oct. 21, 2019, now Pat. No. 11,070,649.

(30) Foreign Application Priority Data

Sep. 5, 2019 (IN) .............................. 201911035742

(51) Int. Cl.
*H04L 9/40* (2022.01)
*H04L 43/065* (2022.01)
*H04L 43/0817* (2022.01)
*H04L 61/4511* (2022.01)

(52) U.S. Cl.
CPC ............ *H04L 63/20* (2013.01); *H04L 43/065* (2013.01); *H04L 43/0817* (2013.01); *H04L 61/4511* (2022.05); *H04L 63/0272* (2013.01); *H04L 63/30* (2013.01)

(58) Field of Classification Search
CPC ... H04L 63/20; H04L 43/065; H04L 43/0817; H04L 61/4511; H04L 63/0272; H04L 63/30
See application file for complete search history.

(56) References Cited

U.S. PATENT DOCUMENTS

| 9,060,239 B1 | 6/2015 | Sinha et al. |
| 9,350,644 B2 | 5/2016 | Desai et al. |
| 9,621,574 B2 | 4/2017 | Desai et al. |
| 9,935,955 B2 | 4/2018 | Desai et al. |

(Continued)

*Primary Examiner* — Philip C Lee
(74) *Attorney, Agent, or Firm* — Baratta Law PLLC; Lawrence A. Baratta, Jr.

(57) ABSTRACT

Systems and methods include providing functionality for the user device while operating in background on the user device including providing secure connectivity with a cloud-based system over a network; continuously collecting packets intercepted by the enterprise application over a time interval, wherein the collected packets are collected over the time interval; and responsive to an issue with functionality of the enterprise application, transmitting the collected packets to a back end server for troubleshooting of the issue. The time interval is a set amount of time, and each collected packet is deleted at the expiration of the time interval.

17 Claims, 6 Drawing Sheets

(56) References Cited

U.S. PATENT DOCUMENTS

| | | | |
|---|---|---|---|
| 2001/0039579 A1 | 11/2001 | Trcka et al. | |
| 2002/0161875 A1 | 10/2002 | Raymond | |
| 2008/0016569 A1 | 1/2008 | Hammer et al. | |
| 2008/0263404 A1* | 10/2008 | Vidiyala | G06F 11/0709 714/38.14 |
| 2014/0033183 A1 | 1/2014 | Brown | |
| 2014/0052645 A1* | 2/2014 | Hawes | G06F 3/0482 705/304 |
| 2015/0319182 A1 | 11/2015 | Natarajan et al. | |
| 2015/0346963 A1* | 12/2015 | Spear | G06F 11/0772 715/733 |
| 2016/0092266 A1 | 3/2016 | Bavishi et al. | |
| 2016/0261564 A1 | 9/2016 | Foxhoven et al. | |
| 2016/0357796 A1 | 12/2016 | Pope et al. | |
| 2017/0017295 A1 | 1/2017 | McPherson et al. | |
| 2017/0325113 A1* | 11/2017 | Markopoulou | H04L 63/0272 |
| 2018/0004848 A1 | 1/2018 | Zeng et al. | |
| 2018/0046802 A1* | 2/2018 | Pyles | H04W 12/128 |
| 2018/0062965 A1* | 3/2018 | McNair | H04L 67/1097 |
| 2018/0115463 A1* | 4/2018 | Sinha | H04L 41/5067 |
| 2018/0206135 A1* | 7/2018 | Chow | H04L 43/20 |
| 2018/0270201 A1* | 9/2018 | Chanak | H04L 67/1021 |
| 2018/0287901 A1* | 10/2018 | Bisada | H04L 41/0631 |
| 2018/0288062 A1 | 10/2018 | Goyal et al. | |
| 2020/0151083 A1* | 5/2020 | Chauhan | G06F 11/0751 |

\* cited by examiner

CLOUD APPLICATION DESIGN FOR EFFICIENT TROUBLESHOOTING

CROSS-REFERENCE TO RELATED APPLICATION(S)

The present disclosure is a continuation of U.S. patent application Ser. No. 17/375,338, filed Jul. 14, 2021 and entitled "Cloud application design for efficient troubleshooting," which is a continuation-in-part of U.S. patent application Ser. No. 16/992,281, filed Aug. 13, 2020 (now U.S. Pat. No. 11,070,578 which issues on Jul. 20, 2021), and entitled "Packet dump utility in a mobile application for efficient troubleshooting," which is a continuation-in-part of U.S. patent application Ser. No. 16/658,264, filed Oct. 21, 2019 (now U.S. Pat. No. 11,070,649, which issues on Jul. 20, 2021, and entitled "Cloud application design for efficient troubleshooting," which claims priority to Indian Patent Application No. 201911035742, filed Sep. 5, 2019, and entitled "Cloud application design for efficient troubleshooting," the contents of each are incorporated by reference in their entirety.

FIELD OF THE DISCLOSURE

The present disclosure relates generally to networking and computing. More particularly, the present disclosure relates to systems and methods for cloud application design for efficient troubleshooting.

BACKGROUND OF THE DISCLOSURE

The number of user devices that connect to the Internet and enterprise networks is exploding. Also, the distinction between private networks (enterprise networks) and the Internet is becoming blurred as fast wireless access (e.g., 5G) and Bring Your Own Device (BYOD) proliferates. Simply put, there is a tremendous number of user devices that are on or have access to secure resources on enterprise networks and which execute enterprise applications. As described herein, a user device can include a mobile device, a smartphone, a tablet, a laptop, a desktop, etc. An enterprise application is one which is executed on the user device for enabling some functionality such as cloud application access, enterprise access, Internet access, etc. An example of an enterprise application is the ZApp (also called Client Connector) from Zscaler, Inc. which is used to provide a distributed security cloud service for Internet access as well as granular policy-based access to internal resources. Of course, there can be other types of enterprise applications, enabling various enterprise or cloud applications.

There is a range of issues that a user could run into with an enterprise application. Enterprise applications tend to behave abnormally on network changes, network connectivity issues, after waking up from sleep, etc. Issues with an enterprise application are significant as it leads to poor Quality of Experience, prevents network or resource access, etc. That is, the cloud is supposed to improve user experience, accessibility, etc., and issues with the enabling tools are critical to resolve. When a user faces an issue, the user reaches out to report the problem so that it can be looked into by the enterprise support of the application. A support engineer can then troubleshoot the problem based on the reported description or application logs. When there are issues, application-level logging is not sufficient to help the support team debug a wide range of issues. Depending on the problem, some of the information may not be available in the logs or required real-time information when the problem was seen. As a result, this can require live debug sessions to help the support team understand the issue and then take steps to resolve this. This is not efficient and causes additional delay in getting the right information from the user. The situation worsens when the issue is sporadic and not reproducible at will.

BRIEF SUMMARY OF THE DISCLOSURE

In an embodiment, a method and computer-readable code stored on a non-transitory computer-readable storage medium having computer-readable code provide steps for a user device to execute an enterprise application. The steps include providing functionality for the user device while operating in background on the user device including providing secure connectivity with a cloud-based system over a network; continuously collecting packets intercepted by the enterprise application over a time interval, wherein the collected packets are collected over the time interval; and responsive to an issue with functionality of the enterprise application, transmitting the collected packets to a back end server for troubleshooting of the issue. The time interval is a set amount of time, and each collected packet is deleted at the expiration of the time interval. The steps can include, responsive to the issue with the functionality of the enterprise application, presenting a user of the user device a list of a plurality of issue types, related to the functionality of the enterprise application, for selection thereof and receiving a selection from the user of an issue type for the issue; and collecting data, including context-specific information, from the user device, the context-specific information being based on the selected issue type received from the user and being related to the functionality of the enterprise application. The collected data can be different for each of the plurality of issue types. The enterprise application can be one of one or more of monitoring, antivirus, firewall, and Virtual Private Networking (VPN) with the cloud-based system. The issue can include any of Domain Name System (DNS) resolution, system overheating, system slowness, abnormal battery drain, and system crashes. The collected packets can be in a PCAP format.

In an embodiment, a method and computer-readable code stored on a non-transitory computer-readable storage medium having computer-readable code provide steps for a user device to execute an enterprise application. The steps include providing functionality for the user device while operating in background on the user device; responsive to a user request, starting collection of packets intercepted by the enterprise application; storing the collected packets on the user device; receiving a selection from the user of an issue type of a plurality of issue types for an issue; and providing the issue type and the collected packets for debugging of the issue type. The steps can further include collecting data from the user device based on the selected issue type. The steps can further include transmitting the collected data and the collected packets to a back end server for troubleshooting of the issue. The functionality can be one or more of monitoring, antivirus, firewall, and Virtual Private Networking (VPN). The functionality can be performed with a cloud-based system over the network. The plurality of issue types can include any of Domain Name System (DNS) resolution, system overheating, system slowness, abnormal battery drain, and system crashes. The collected data can be different for each of the plurality of issue types. The collected packets can be in a PCAP format.

In another embodiment, a user device includes a network interface communicatively coupled to a network; a processor communicatively coupled to the network interface; and memory storing computer-executable instructions for an enterprise application that, when executed, cause the processor to provide functionality for the user device while operating in background on the user device; responsive to a user request, start collection of packets intercepted by the enterprise application; store the collected packets on the user device; receive a selection from the user of an issue type of a plurality of issue types for an issue; and provide the issue type and the collected packets for debugging of the issue type.

In an embodiment, a non-transitory computer-readable storage medium includes computer-readable code stored thereon for programming a user device to execute an enterprise application that performs steps of providing functionality for the user device while operating in background on the user device; responsive to an issue with the functionality of the enterprise application and presenting a user of the user device a list of a plurality of issue types for selection thereof, receiving a selection from the user of an issue type for the issue; and collecting data from the user device based on the selected issue type. The computer-readable code stored thereon can be further programmed performs steps of transmitting the collected data to a back end server for troubleshooting of the issue.

The functionality can be one or more of monitoring, antivirus, firewall, and Virtual Private Networking (VPN). The functionality can be performed with a cloud-based system over the network. The plurality of issue types can include any of Domain Name System (DNS) resolution, system overheating, system slowness, abnormal battery drain, and system crashes. The collected data can be different for each of the plurality of issue types. The collected data can be captured while the issue is occurring to assist in troubleshooting thereof.

In another embodiment, a user device includes a network interface communicatively coupled to a network; a processor communicatively coupled to the network interface; and memory storing computer-executable instructions that, when executed, cause the processor to provide functionality for the user device while operating in background on the user device, responsive to an issue with the functionality of the enterprise application and with a user of the user device presented a list of a plurality of issue types for selection thereof, receive selection from the user of an issue type for the issue, and collect data from the user device based on the selected issue type.

In a further embodiment, a method implemented by an enterprise application includes providing functionality for a user device while operating in background on the user device; responsive to an issue with the functionality of the enterprise application and presenting a user of the user device a list of a plurality of issue types for selection thereof; receiving a selection from the user of an issue type for the issue; and collecting data from the user device based on the selected issue type

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a block diagram of a server that may be used in the cloud-based system of FIGS. 1A and 1B or the like;

FIG. 3 is a block diagram of a user device that may be used with the cloud-based system of FIGS. 1A and 1B or the like;

DETAILED DESCRIPTION OF THE DISCLOSURE

The present disclosure relates to systems and methods for cloud application design for efficient troubleshooting. The present disclosure includes the incorporation of specific troubleshooting data flows when a user is facing issues. These flows would automatically interact with the user's current network/local system and gather relevant information, for context-specific troubleshoot information. The context-specific troubleshoot information would be helpful in debugging the problem and finding the root cause without requiring any additional session with the user. Since a significant number of issues are not always reproducible predictably, this has an added advantage of capturing the data when the issue is happening.

Example Cloud-Based System

Figure 1A:
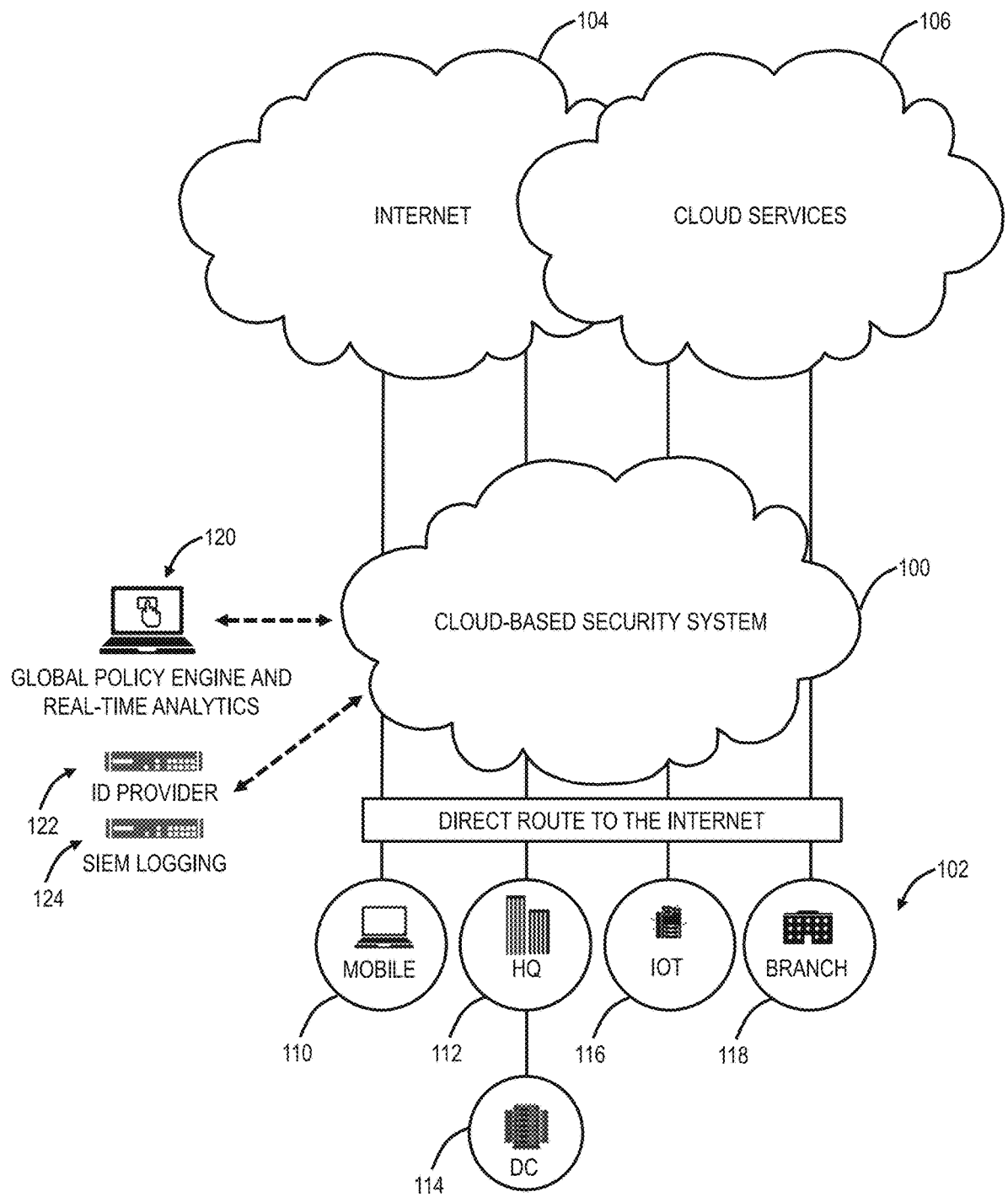
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
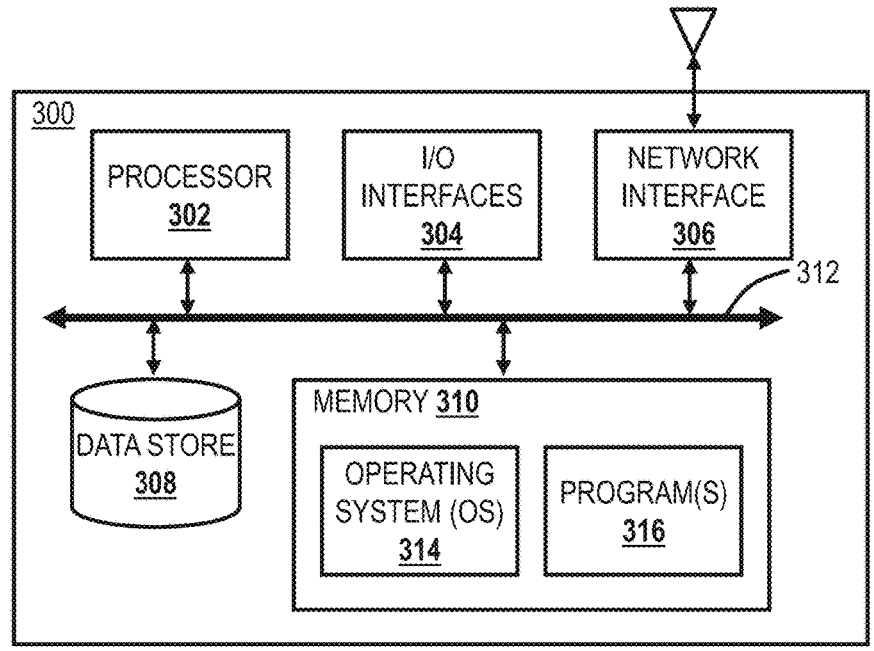

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 106) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 1B:
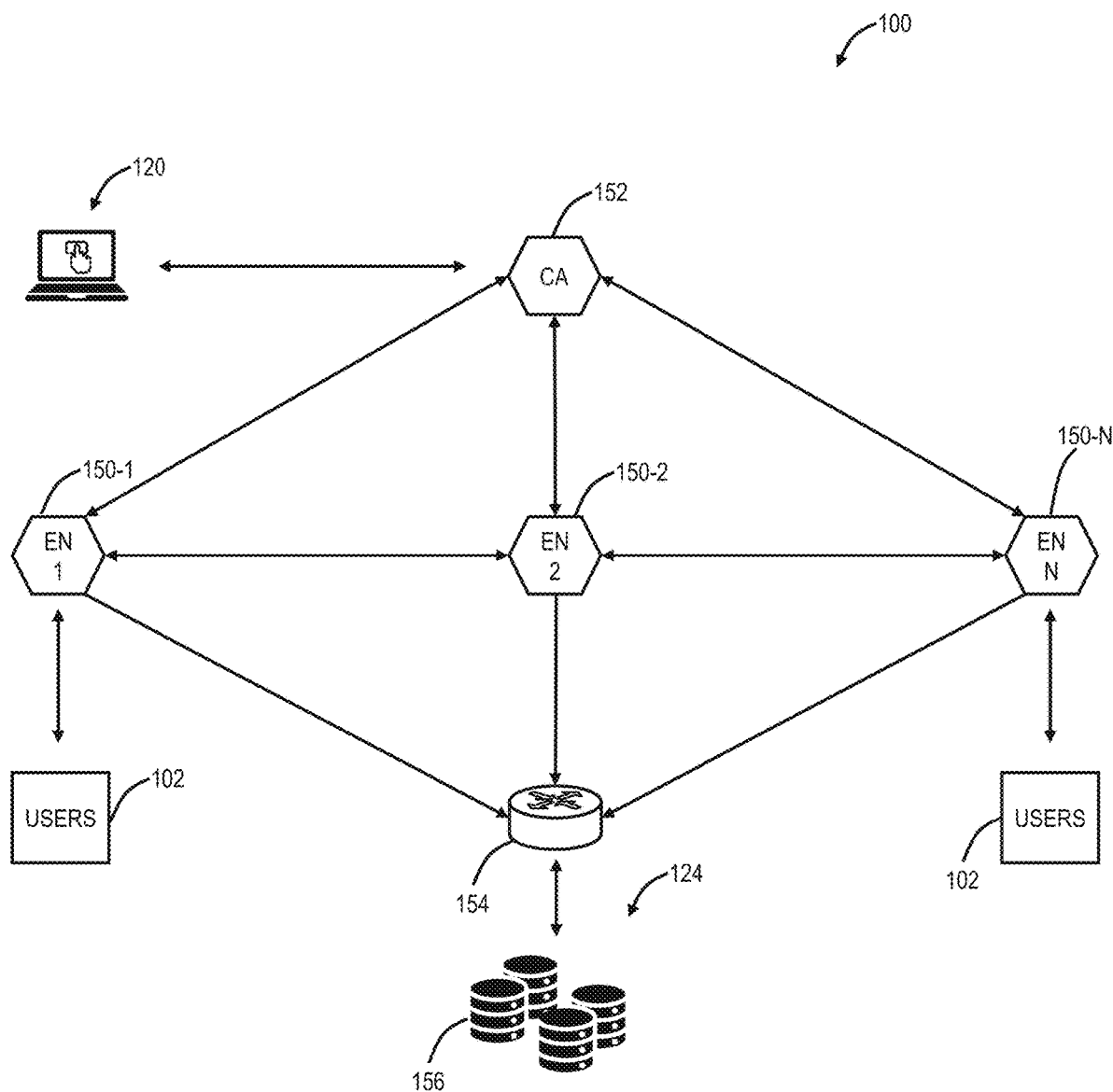
FIG. 1B is a network diagram of an example implementation of the cloud-based system.
Figure 2:
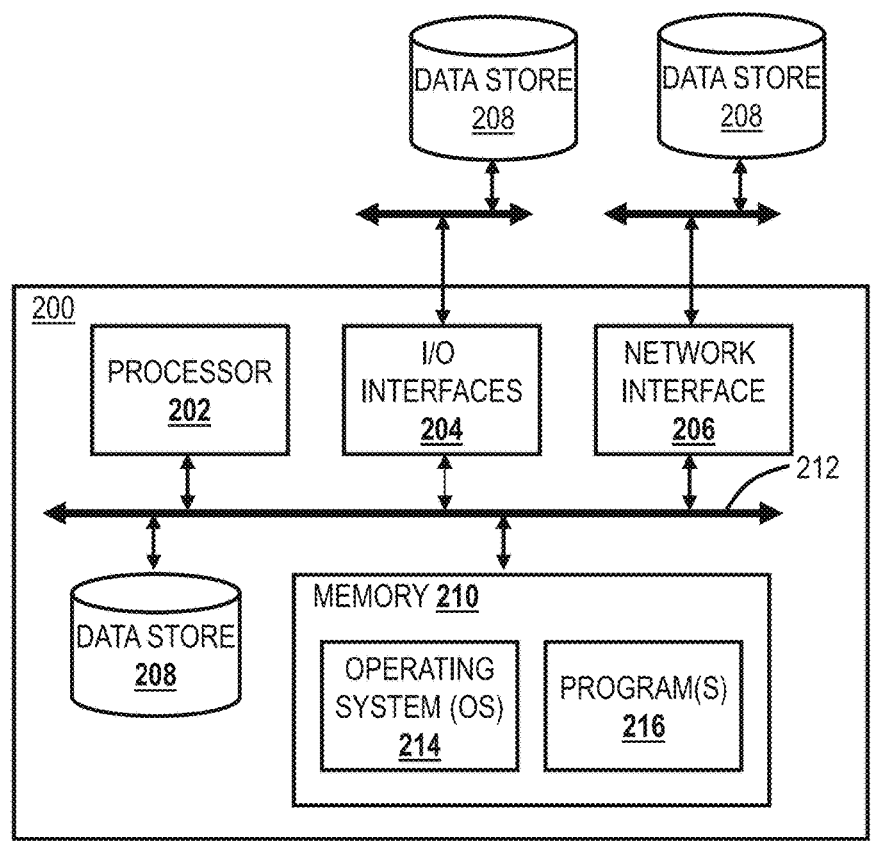

FIG. 1B is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. That is, a single node 150, 152 can be a cluster of devices. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 2 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 3 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 4:
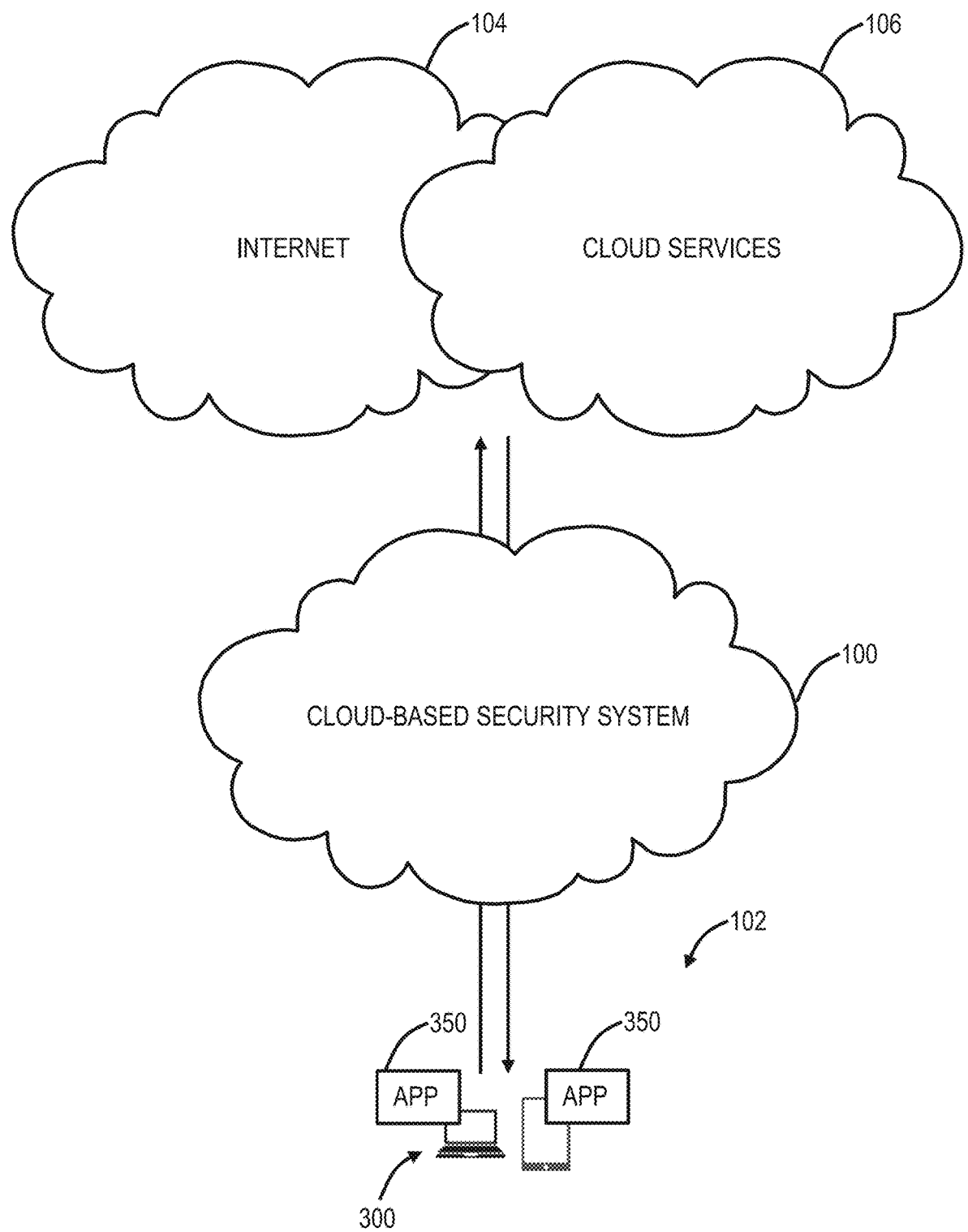
FIG. 4 is a network diagram of the cloud-based system illustrating an application on user devices with users configured to operate through the cloud-based system.

FIG. 4 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for a seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 before accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

The application 350 is executed on a user device 300. The application 350 can dynamically learn all available services, adapts to changing network environments and provides a seamless and secure network resource access to Internet and darknet hosted applications. This is achieved through dynamic evaluation of network conditions, enrollment to individual services, learning individual service protocols, creating a link-local network on the device 300, and establishing multiple secure tunnels to cloud services over this local network.

The application 350 is communicatively coupled to an agent manager in the cloud-based system 100, etc. The application 350 enables communication to enterprise private resources via the cloud-based system 100 and to the Internet 104 cloud-based system 100. The application 350 operates on a client-server model where an Information Technology (IT) admin enables appropriate services for end-users at a Cloud Administration Server (CAS) which can be part of an agent manager. Every client can make a unicast request to the agent manager (e.g., CAS) to discover all enabled services. On acknowledging the response, the client issues a request to authenticate to each service's cloud Identity Providers, an enterprise SAML IDP. Authentication can be multi-factor depending upon the nature of the service. On successful authentication, server contacts Mobile Device Management (MDM) or Inventory management provider to define access control rights for the device 300. Post authorization, the device 300 is successfully enrolled into the agent manager which tracks and monitors all behavior of the device 300.

Post-enrollment, the user device 300 creates a link-local network with a specific Internet Protocol (IP) configuration, opens a virtual network interface to read and write packets and opens multiple listening sockets at custom ports to create secure tunnels to available services through the cloud-based system 100. On network changes, the device 300 dynamically evaluates reachability to pre-configured domains and depending upon the result it appropriately transitions all network tunnels, thus providing a seamless experience to the end-user. Further, the device 300 also intelligently learns the conditions which are appropriate for setting up network tunnels to cloud services depending upon several network heuristics such as reachability to a particular cloud service.

Application—Functionality

The application 350 enables a user to connect to multiple cloud services through the dynamic discovery of available services followed by authentication and access as exposed in the corresponding service protocol. The application 350 addresses the unmanageable growth of mobility and cloud-based services, which have led to a proliferation of individual applications for access to individual services. The application 350 can be implemented through a mobile application ("app") which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end-user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end-user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

Generally, the application 350 can support two broad functional categories—1) dynamic service discovery and access controls and 2) service availability. The dynamic service discovery and access controls include service configuration by the administrator, service discovery by the device 300, service acknowledgment and authentication, service authorization and enrollment, and the like. For service configuration by the administrator, the IT admin can provide cloud service details at a centralized knowledge server, such as part of the agent manager, the enterprise asset management, etc. The cloud service details include the service type (e.g., Internet/intranet), network protocol, identity provider, server address, port, and access controls, etc.

For service discovery by the device 300, the device 300 can issue a network request to a known Cloud Administrative Server (CAS) in the agent manager to discover all enabled services for a user. If a specific cloud server is not known a priori, the device 300 can broadcast the request to multiple clouds, e.g., through the agent manager communicating to the enterprise asset management, the enterprise SAML IDP, etc.

For the service acknowledgment and authentication, the device 300 acknowledges the response of service discovery and initiates the authentication flow. The device 300 learns the authentication protocol through the service discovery configuration and performs authentication of a configured nature at the enterprise SAML IDP. For the service authorization and enrollment, post successful authentication, the CAS, authorizes the device 300 and fetches the access control information by contacting an MDM/Inventory Solutions Provider. Depending upon the user context and the nature of access, the CAS enrolls the device 300 into several cloud services and informs the cloud services that the user has been enrolled for access.

The service availability includes link-local network setup, a traffic interceptor, and dynamic traffic forwarding tunnels to authorized services. The link-local network setup, post-enrollment, has the device 300 create a local network on the device 300 itself to manage various networking functionalities. For the traffic interceptor, the device 300 intercepts and evaluates all Internet traffic. Allowed traffic is tunneled to the cloud services such as in the security cloud 408, whereas the rest of the traffic is denied as per enterprise policies. For the dynamic traffic forwarding tunnels to authorized services, depending upon the evaluation, the device 300 splits the traffic into the different tunnel to individual cloud services such as in the security cloud 408.

The application 350 is a single application that provides secure connectivity to the Internet 104 and darknet hosted applications, such as the private enterprise resources. The application 350 communicates securely to the agent manager, which is controlled by an IT admin. The application 350 learns available services and authenticates with each service. Post proper enrollment, the application 350 securely connects to cloud services by means of network tunnels.

Again, the application 350 is an example application, such as ZApp from Zscaler, Inc. Other types of enterprise applications are also contemplated herein. In general, the application 350 is executed on the user device 300, typically in the background. The application 350 enables some cloud-based functionality with the user device 300 and the cloud-based system 100. Further, issues with the application 350 are critical to resolve to ensure connectivity and access to the cloud-based system 100.

Enterprise Application Troubleshooting Process

Figure 5:
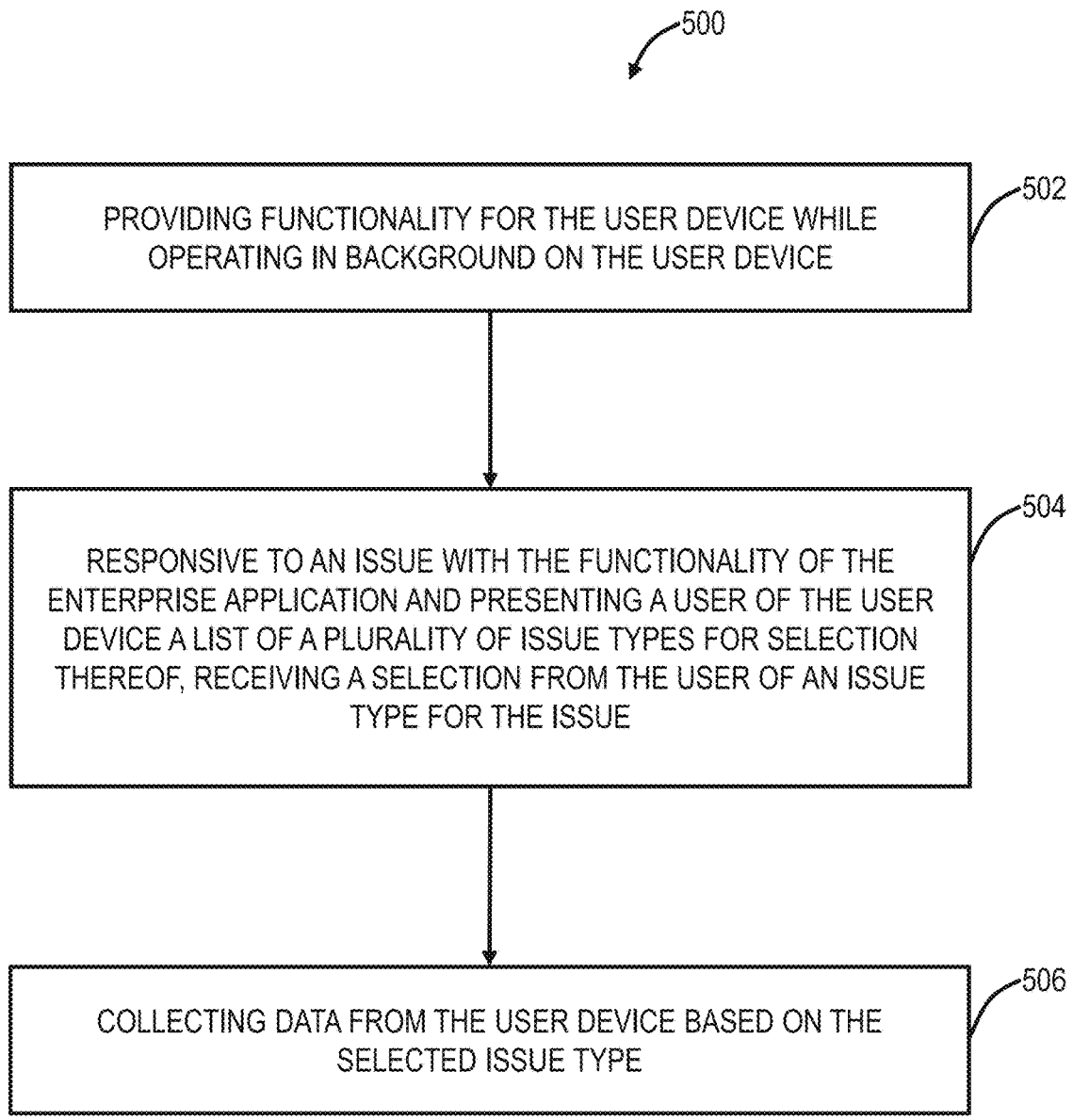
FIG. 5 is a flowchart of an enterprise application troubleshooting process.

FIG. 5 is a flowchart of an enterprise application troubleshooting process 500. The enterprise application troubleshooting process 500 contemplates operation as a computer-implemented method on the user device 300 and can be embodied as computer-readable code stored on a non-transitory computer-readable storage medium. The enterprise application troubleshooting process 500 includes providing functionality for the user device while operating in background on the user device 300 (step 502); responsive to an issue with the functionality of the application 350 and presenting a user of the user device 300 a list of a plurality of issue types for selection thereof, receiving a selection from the user of an issue type for the issue (step 504) and collecting data from the user device based on the selected issue type (step 506). The enterprise application troubleshooting process 500 can further include transmitting the collected data to a back-end server for troubleshooting of the issue.

The functionality can be one or more of monitoring, antivirus, firewall, and Virtual Private Networking (VPN). The functionality can be performed with a cloud-based system 100 over the network, i.e., the Internet. The plurality of issue types can include any of Domain Name System (DNS) resolution, system overheating, system slowness, abnormal battery drain, and system crashes. The collected data is different for each of the plurality of issue types. The collected data can be captured while the issue is occurring to assist in troubleshooting thereof.

Thus, when a user of the user device 300 is having a problem with the application 350, the user can select a problem category to report the issue. For example, the plurality of issue types can be the problem category and can be displayed via a User Interface (UI) on the user device 300. The user device 300 can gather context-specific information based on the selected problem category and then include the collected context-specific information with a report of the issue. Advantageously, this approach significantly improves the troubleshooting process and more importantly captures data where it may not be possible to predictably reproduce the issue.

Use Cases

Again, the application 350 can always run on the user device 300 in the background. For example, the application 350 could be a monitoring software, antivirus app, firewall, VPN client, etc. For example, a user facing delay in Domain Name System (DNS) resolution can select the associated problem while reporting the issue. The application 350 would collect nslookup or ping output and would attach this information in the issue reporting. Similarly, for system overheating, the application would collect CPU usage, memory profile, etc. The problem categories would be based on the functionality of the application and the possible network/system areas it interacts with.

In an embodiment, a user is experiencing slowness in the browsing, and the websites are taking a long time to load.

The user suspects this issue to be related to the network app X running on the system. The user would report the issue in the network app X under "Slow browsing" tab. The network app X would collect the data under various heads which could impact the browsing experience of the user such as Traceroute, ping, Hypertext Transfer Protocol (HTTP) header traces, packet capture, etc would be relevant to troubleshoot this issue. The data using all these utilities/commands would be collected at the real-time of reporting and sent to the enterprise support.

In another embodiment, a user is experiencing the user device 300 heating up intermittently or when performing a particular task. The user suspects it to be related to the network app and tries to report the issue under "System heating up" tab. The network app X would collect packet capture, process list, network adapter statistics, system information, etc.

In a further embodiment, the user is facing an abnormal battery drain on the system. The user suspects that it is caused by the network app X, and therefore reports the issue under "Battery Drain" tab. The network app X would collect system information, CPU and memory per process, system event logs. This would help support in identifying the actual process on the system that is utilizing high resources and causing the problem.

In a further embodiment, the user is normally running the network app X on the user device 300 and suddenly faces "Blue Screen of Death" (BSoD). The user wants to know to know the root cause and suspects the network app X to be the reason. The user would report the issue under "Blue Screen." The network app X would now collect event logs, system information, etc.

Figure 6:
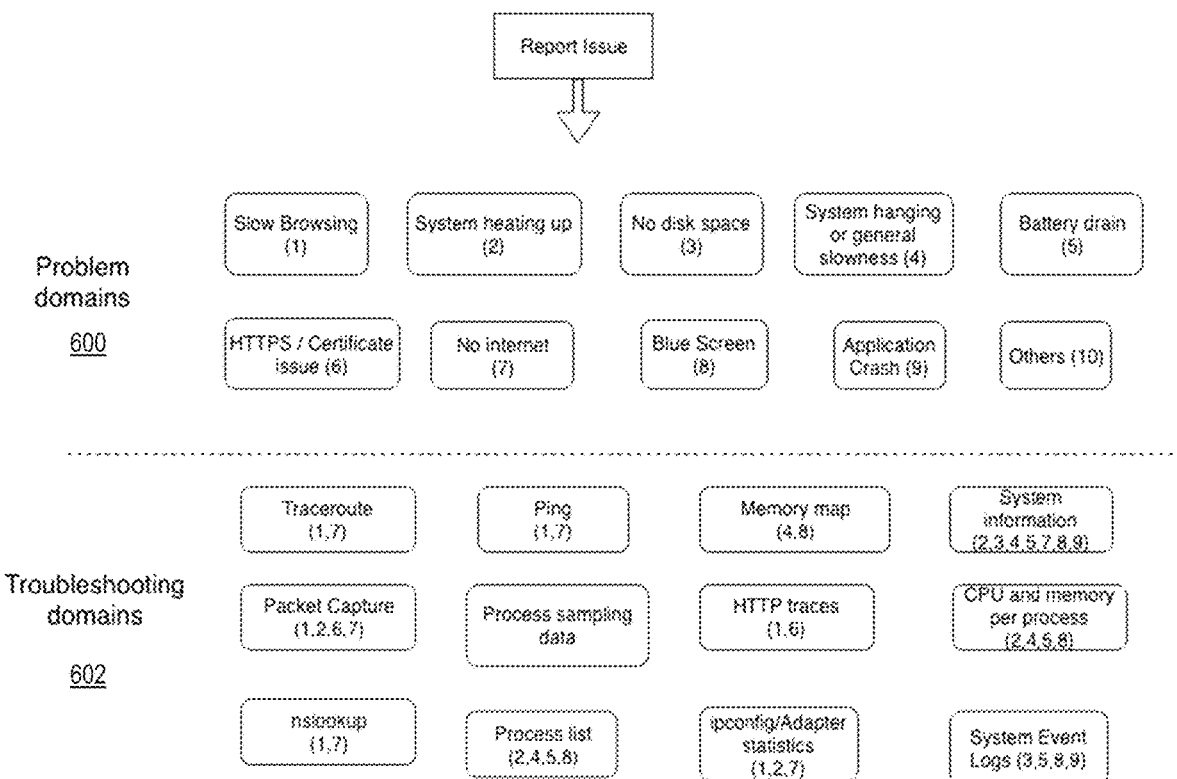
FIG. 6 is a diagram illustrating a list of problems and a mapping of data collected based thereon.

FIG. 6 is a diagram illustrating a list of problems 600 and a mapping of data 602 collected based thereon. For example, the problems 600 can include slow browsing, system heat up, no disk space, hanging or general slowness, battery drain, HTTPS/certificate issue, no Internet, blue screen, application crash, or other.

The data 602 can be, for example, traceroute, ping, memory map, system information, packet capture, sampling data, HTTP traces, CPU and memory information per process, nslookup, process list, IP config/network adaptor statistics, system event logs, etc. The present disclosure includes an example mapping of what data 602 is captured for which problem 600. For other, or unknown, all of the data 602 can be captured.

Packet Dump

It has been determined the application 350, as well as other types of mobile applications, tends to behave abnormally on network changes, network connectivity issues, on waking up the device 300 after a long time, slowness issues, etc. Application level logging is not sufficient to help the support team debug the wide range of issues. Application level logging is based on data from the application 350 alone. There is a requirement for extensive network level debugging to identify the root cause. Without this information, a support engineer has to conduct a live debug to understand the user's network conditions and then simulate the user's network infrastructure in-house and try to reproduce the issue to identify the root cause. This is inefficient, time consuming, and conditions may be different.

To solve this problem, a packet dump utility is included in the application 350, as well as in other enterprise network applications. This will dump the network packets [in PCAP format] at the time issue occurs, which can be later used by support engineer for troubleshooting. The support engineer would require packet captures (PACPs) to troubleshoot for slowness, connectivity problems, packets drop, retransmission, Transmission Control Protocol (TCP) handshake failures, and many more such issues. As is known in the art, PCAP is an Application Programming Interface (API) for capturing network traffic. PCAP is an abbreviation of "Packet Capture."

When a user, via the user device 300 and the application 350, is facing some problem such as slow browsing, connectivity issues, etc, the user can go to the application 350 and select/enable a "Start Packet Dump" button from the UI. The application 350 (firewall, VPN, etc.) already intercepts the packets. The utility will collect the on-going traffic from the application 350 and dump those into a PCAP format with metadata such as the time of capture. The user can then tap the "Stop Packet Dump" button on the application 350 to stop. The utility will automatically store the packets in a file on the user device 350. This can be used by support engineer to troubleshoot and find what the actual point of failure was.

The context specific packet captures would be helpful in debugging the problem and finding the root cause without requiring user to reproduce it and support engineer to conduct any additional session with the user. Since a lot of issues are not always reproducible predictably, this has an added advantage of capturing the packets when the issue is happening.

The packet dump has been described with reference to the application 350. However, the packet dump can be integrated to any network application already intercepting traffic, including the application 350, running on any mobile operating system (like android, iOS, etc), saves the network packets in the standard PCAP format in an output file. The packets can be dumped at a virtual interface or tunnel extension interface provided by the operating system. This file could be opened in any traditional network tool, like Wireshark, capable of reading the PCAP format, for debugging issues occurring on mobile devices.

Note, iOS does not support a packet trace directly. A workaround can include an external computer recording a packet trace on an attached iOS device using the Remote Virtual Interface (RVI) mechanism. Without this disclosure, if a customer with the application 350 complains about any network issue on an iOS device, customer support advises the customer to connect their iOS device to a Mac machine and then capture packets on the virtual interface that shows on the Mac (corresponding to interface that iOS uses to share the Internet). This is cumbersome and mostly infeasible as not every customer has access to a Mac machine.

Procedure to Debug Issues from Captured Packets

The packet captures can be used to glean all sorts of useful information from an application as it runs. It will show all of the network calls that are occurring under the hood of an application. The captured packets are helpful in debugging a variety of issues such as slow DNS resolution, slow HTTP communication, connection close issues, SSL handshake failure, SSL interception issues, packet fragmentation issues, authentication issues, etc.

Once a user faces a problem, the user can run the packet dump utility which would save the network packets in a file. It is also possible to apply filters to show only traffic from specific applications, and then apply another filter to show only traffic to other machines. In an embodiment, the packet dump utility captures all packets. In another embodiment, the packet dump utility can capture a certain type of packets. That is, the filtering can be on all of the packets in a troubleshooting application, or the filtering can be on the front end during the packet capture. The filtering allows a troubleshooter to look for specific things. The filters can be on the basis of source IP or port, destination IP or port, protocol like DNS, HTTP, TCP, UDP, SSL, etc.

If the user experiences delay in accessing websites on the user device 300, this utility integrated in the enterprise network application 350 can collect network traffic and would provide enough information of DNS and HTTP packets to debug the problem. Similarly, in a company network doing SSL interception, this can cause mobile apps to break due to SSL issues. SSL interception (also TLS or HTTPS interception) is the process of encrypted internet communication between a client (e.g., the device 300) and a server. The interception can be executed between the sender and the receiver and vice versa (receiver to sender)—it's the same technique used in man-in-the-middle (MiTM) attacks, without the consent of both entities. This interception is performed for inspection, such as via the system 100. In such cases as well, the captured packets can show the SSL certificates, ciphers, etc. used in the communication and help debug the problem. In another example, the enterprise application 350 using UDP based tunnels can cause mobile apps to break/slow down due to packet fragmentation issues. With this utility, it is easy to debug/detect this kind of problem.

Background Applications

A user can use an application that is always running on the user device 300 in the background. This application could be a monitoring software, antivirus app, firewall, VPN client, etc.

There are a range of issues that this user could run into due to this application. When the user faces an issue, the user reaches out to report the problem so that it can be looked into by the enterprise support of the application. The support engineer will then troubleshoot the problem based on the reported description or application logs. But depending on the problem, some of the information may not be available in the logs or required real time information when the problem was seen. The support engineer would need to ask the user to collect relevant information in the future and report back. This is not efficient and causes additional overhead. The situation worsens when the issue is sporadic and not reproducible at will.

In this solution, we propose to include real time monitoring data whenever a user reaches out to report an issue. The application records important information at any point of time for the last 15 minutes and provides that information along with the logs. For example, the network issues require packet captures when the issue happens. This would be difficult to capture later in time but the application keeps track of last 15 mins captures at any point and makes that available. In another instance when the application happens to crash, the state of the machine gets lost once the user resumes activity. But our solution records system statistics like CPU, memory, battery, process dump at regular intervals and makes that available for analysis.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming a user device to execute an enterprise application that performs steps of:
   providing functionality for the user device while operating in background on the user device including providing secure connectivity with a cloud-based system over a network;
   receiving a request from a user for troubleshooting an issue, the request being submitted through the enterprise application;
   responsive to the user request for troubleshooting an issue, collecting packets via an external computer recording a packet trace, the packets including context-specific information, the context-specific information being based on a selected issue type received from the user;
   providing the collected packets, including the context-specific information, for debugging of the issue type;

responsive to an issue with the functionality of the enterprise application, presenting the user of the user device a list of a plurality of issue types, related to the functionality of the enterprise application, for selection thereof and receiving a selection from the user of the issue type for the issue; and collecting data, including the context-specific information, from the user device, the context-specific information being based on the selected issue type received from the user and being related to the functionality of the enterprise application.

2. The non-transitory computer-readable storage medium of claim 1, wherein the packets are collected over a time interval, and the time interval is a set amount of time, and each collected packet is deleted at the expiration of the time interval.

3. The non-transitory computer-readable storage medium of claim 1, wherein the collected data is different for each of the plurality of issue types.

4. The non-transitory computer-readable storage medium of claim 1, wherein the enterprise application is one of one or more of monitoring, antivirus, firewall, and Virtual Private Networking (VPN) with the cloud-based system.

5. The non-transitory computer-readable storage medium of claim 1, wherein the issue includes any of Domain Name System (DNS) resolution, system overheating, system slowness, abnormal battery drain, and system crashes.

6. The non-transitory computer-readable storage medium of claim 1, wherein the collected packets are in a PCAP format.

7. A user device comprising:
a network interface communicatively coupled to a network;
a processor communicatively coupled to the network interface; and
memory storing computer-executable instructions for an enterprise application that, when executed, cause the processor to perform steps of
providing functionality for the user device while operating in background on the user device including providing secure connectivity with a cloud-based system over a network;
receiving a request from a user for troubleshooting an issue, the request being submitted through the enterprise application;
responsive to the user request for troubleshooting an issue, collecting packets via an external computer recording a packet trace, the packets including context-specific information, the context-specific information being based on a selected issue type received from the user;
providing the collected packets, including the context-specific information, for debugging of the issue type;
responsive to an issue with the functionality of the enterprise application, presenting the user of the user device a list of a plurality of issue types, related to the functionality of the enterprise application, for selection thereof and receiving a selection from the user of the issue type for the issue; and
collecting data, including the context-specific information, from the user device, the context-specific information being based on the selected issue type received from the user and being related to the functionality of the enterprise application.

8. The user device of claim 7, wherein the packets are collected over a time interval, and the time interval is a set amount of time, and each collected packet is deleted at the expiration of the time interval.

9. The user device of claim 7, wherein the collected data is different for each of the plurality of issue types.

10. The user device of claim 7, wherein the enterprise application is one of one or more of monitoring, antivirus, firewall, and Virtual Private Networking (VPN) with the cloud-based system.

11. The user device of claim 7, wherein the issue includes any of Domain Name System (DNS) resolution, system overheating, system slowness, abnormal battery drain, and system crashes.

12. The user device of claim 7, wherein the collected packets are in a PCAP format.

13. A method implemented by an enterprise application comprising steps of:
providing functionality for a user device while operating in background on the user device including providing secure connectivity with a cloud-based system over a network;
receiving a request from a user for troubleshooting an issue, the request being submitted through the enterprise application;
responsive to the user request for troubleshooting an issue, collecting packets via an external computer recording a packet trace, the packets including context-specific information, the context-specific information being based on a selected issue type received from the user;
providing the collected packets, including the context-specific information, for debugging of the issue type; and
responsive to an issue with the functionality of the enterprise application, presenting the user of the user device a list of a plurality of issue types, related to the functionality of the enterprise application, for selection thereof and receiving a selection from the user of the issue type for the issue; and
collecting data, including the context-specific information, from the user device, the context-specific information being based on the selected issue type received from the user and being related to the functionality of the enterprise application.

14. The method of claim 13, wherein the packets are collected over a time interval, and the time interval is a set amount of time, and each collected packet is deleted at the expiration of the time interval.

15. The method of claim 13, wherein the enterprise application is one of one or more of monitoring, antivirus, firewall, and Virtual Private Networking (VPN) with the cloud-based system.

16. The method of claim 13, wherein the issue includes any of Domain Name System (DNS) resolution, system overheating, system slowness, abnormal battery drain, and system crashes.

17. The method of claim 13, wherein the collected packets are in a PCAP format.

* * * * *